US 12,051,933 B2

(12) United States Patent
Hogan

(10) Patent No.: US 12,051,933 B2
(45) Date of Patent: Jul. 30, 2024

(54) DUAL BATTERY CHARGING SYSTEM AND A METHOD OF USE THEREOF

(71) Applicant: Dennis M Hogan, Deer Park, WA (US)

(72) Inventor: Dennis M Hogan, Deer Park, WA (US)

(*) Notice: Subject to any disclaimer, the term of this patent is extended or adjusted under 35 U.S.C. 154(b) by 53 days.

(21) Appl. No.: 18/116,624

(22) Filed: Mar. 2, 2023

(65) Prior Publication Data

US 2023/0216326 A1  Jul. 6, 2023

Related U.S. Application Data

(60) Provisional application No. 63/295,921, filed on Jan. 2, 2022.

(51) Int. Cl.
*H02J 7/35* (2006.01)
*H01M 10/44* (2006.01)
*H02J 7/00* (2006.01)

(52) U.S. Cl.
CPC ....... *H02J 7/00712* (2020.01); *H01M 10/441* (2013.01); *H02J 7/0013* (2013.01); *H02J 7/0029* (2013.01); *H02J 7/0042* (2013.01); *H02J 7/0047* (2013.01); *H01M 2220/20* (2013.01)

(58) Field of Classification Search
CPC .... H02J 7/00712; H02J 7/0013; H02J 7/0047; H02J 7/0042; H02J 7/0029; H01M 10/441

See application file for complete search history.

(56) References Cited

U.S. PATENT DOCUMENTS 9,997,954 B2 * 6/2018 Yamamoto ................ H02J 7/35
2016/0322859 A1 * 11/2016 Yamamoto ............. H02J 7/342
2023/0138183 A1 * 5/2023 Yang ..................... H02J 7/0024
                                                        320/117

* cited by examiner

*Primary Examiner* — Jared Fureman
*Assistant Examiner* — Esayas G Yeshaw
(74) *Attorney, Agent, or Firm* — Barry Choobin; Patent 360

(57) ABSTRACT

A system and method for managing and controlling the charging and discharging of dual batteries in a vehicle, wherein the auxiliary battery is a lithium-ion battery, and the primary battery can be of any type. The system includes a charging circuitry for charging the lithium-ion batteries using power from the power supply of the vehicle. The system further includes a controller that prioritizes the charging of the primary battery. The controller allows simultaneous charging of the primary battery and the secondary battery when the charging status of the primary between is about 13.5 Volts and prevents charging of the secondary battery when the voltage source is below 13.2 Volts.

17 Claims, 3 Drawing Sheets

DUAL BATTERY CHARGING SYSTEM AND A METHOD OF USE THEREOF

CROSS-REFERENCE TO RELATED APPLICATIONS

This application claims priority from a U.S. provisional patent application Ser. No. 63/295,921, filed on Jan. 2, 2022, which is incorporated herein by reference in its entirety.

FIELD OF INVENTION

The present invention relates to a dual battery charging system, and more particularly, the present invention relates to a system and method for controlling the charging and discharging of dual batteries in which at least the auxiliary battery is lithium-ion battery.

BACKGROUND

A vehicle battery is chiefly designed for starting an engine of a vehicle, so the battery is also known as a cranking battery. The battery can support a few additional accessories that typically draw less current. However, when the number of accessories or appliances, or devices is increased or has to be increased, the corresponding increase in load cannot be supported by the battery that sole function is to crank the engine. In such a case, a second battery is added. The secondary battery, also referred to as an auxiliary battery, may also be added as a backup when the primary battery fails. The auxiliary components can be powered by the secondary battery.

The charging circuitry provided by the manufacturer is designed to charge the primary battery. Connecting the secondary battery to the alternator or primary battery for charging may damage both batteries and may result in the dead primary battery. Moreover, drawing current from the primary battery by devices supposed to draw the current from the second battery may result in the discharged primary battery that cannot crank the engine.

Few battery management interfaces are known in the art; however, the known battery management interfaces suffer from one or more drawbacks or limitations. The primary limitation is that the battery management interfaces are designed for lead-acid batteries. The use of lithium-ion batteries is becoming more common nowadays. The users prefer to at least have the additional battery as lithium-ion battery. The primary battery may also be replaced by the lithium-ion battery. However, the charging and discharging parameters of the lithium-ion batteries are quite different from those of lead-acid batteries. The incompatibility generally leads to underperformance, battery damage, and shorter battery life.

A need is therefore appreciated for a dual battery management interface for adding lithium-ion batteries as auxiliary batteries.

The primary battery refers to the main battery of the vehicle that is used for starting the vehicle and can be of any type, such as lead acid or lithium ion battery. The secondary battery is a lithium-ion battery.

SUMMARY OF THE INVENTION

The principal object of the present invention is therefore directed to a dual battery management system for lithium-ion batteries or a combination of lead acid battery and lithium-ion battery.

It is another object of the present invention that the dual battery management system prioritizes the charging of the primary battery.

It is still another object of the present invention that the dual battery management system prevents discharging of the primary battery by devices connected to the secondary battery.

It is yet another object of the present invention that the dual battery management system provides charging and discharging of the batteries based on standard voltages of lithium-ion batteries.

It is a further object of the present invention that the dual battery management system enhances the primary and second battery life.

It is still a further object of the present invention that the dual battery management system is compact and rugged in construction.

It is yet a further object of the present invention that the dual battery management system is easy to install.

It is an additional object of the present invention that an auxiliary lithium-ion battery can be used in combination with primary lead acid battery.

It is still an additional object of the present invention that the charging efficiency can be enhanced.

It is yet an additional object of the present invention that the charging of the primary battery can be prioritized.

It is an object of the present invention that the charging and discharging of the auxiliary battery is safe.

In one aspect, disclosed is a dual battery management system that connects the primary battery and the secondary battery to the power supply and ensures safe charging of the batteries. The disclosed dual battery management system can specifically be used for lithium-ion batteries that take into account the specific charging and discharging profiles of the lithium-ion batteries protecting the batteries from incompatible charging and discharging conditions. The disclosed dual battery management system can prevent damage to either the primary battery or the second battery due to incompatible charging and discharging profiles.

In one aspect, disclosed is a system for managing the charging and discharging of dual batteries in a vehicle in which at least the secondary battery is lithium-ion battery, the charging is from a power supply of the vehicle, the system comprises a housing; a charging circuitry configured to charge a primary battery and a secondary battery, wherein the charging circuitry is configured to determine charging status of the primary battery and the secondary battery; and a controller encased with the housing and operably coupled to the charging circuitry, wherein the controller is configured to prioritize charging of the primary battery over the secondary battery, allowing simultaneous charging of the primary battery and the secondary battery when the charging status of the primary between is about 13.5 Volts, and prevents charging of the secondary battery when the power source is below 13.2 Volts, and isolate the secondary battery to prevent the drawing of current from the primary battery by devices connected to the secondary battery. The housing has a transparent cover. The housing is waterproof. The system further comprises an LED indicator, the LED indicator turns on upon simultaneous charging of the primary battery and the secondary battery. The LED indicator is encased within the transparent cover.

In one aspect, disclosed is a method for managing charging and discharging of dual batteries in a vehicle, the charging is from a power supply/source of the vehicle, the method comprising providing a system comprising a housing, a charging circuitry configured to charge a primary battery and a secondary battery, the primary battery and the secondary battery are lithium-ion batteries, wherein the charging circuitry is configured to determine charging status of the primary battery and the secondary battery, and a controller encased with the housing and operably coupled to the charging circuitry, wherein the controller is configured to prioritize charging of the primary battery over the secondary battery, allowing simultaneous charging of the primary battery and the secondary battery when the charging status of the primary between is about 13.5 Volts, prevents charging of the secondary battery when the voltage source is below 13.2 Volts, and isolate the secondary battery to prevent the drawing of current from the primary battery by devices connected to the secondary battery.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
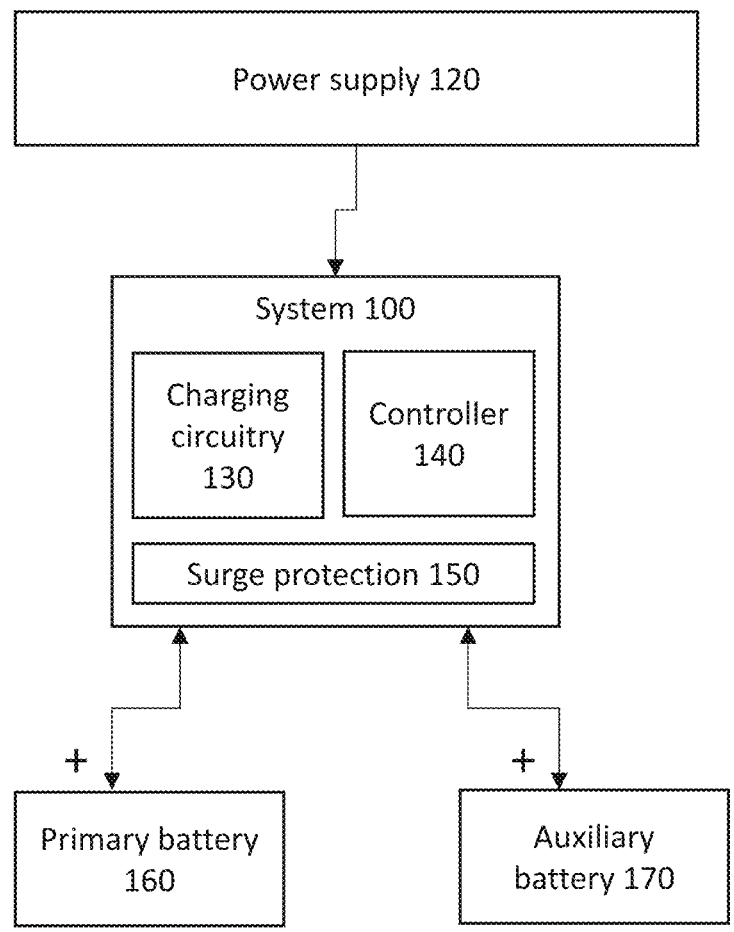
FIG. 1 is a block diagram showing an environment of the disclosed system, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed are a system and method for managing/controlling the charging and discharging of dual batteries in vehicles that are primarily equipped with a single battery for cranking the engine. The disclosed system allows adding an auxiliary lithium-ion battery. The original battery may or may not be a lithium-ion battery. The primary battery can be replaced by a lithium-ion battery, or a combination of primary lead acid battery and a secondary lithium-ion battery can be used. It is understood that the primary battery can be of any type. The disclosed system and method are designed specifically for incorporating a second lithium-ion battery. Embodiments have been described for two batteries, however, more than one auxiliary battery can be incorporated and managed by the disclosed system, and any number of auxiliary batteries are within the scope of the present invention. The disclosed system and method can provide for controlling both the charging and discharging of the batteries. A second battery can be easily added without affecting the primary battery. Additional appliances/devices/accessories can be added to the secondary battery. The disclosed system can prioritize charging of the primary battery over the auxiliary batteries, and the auxiliary battery can be charged when additional power is available. The disclosed system can also isolate the auxiliary batteries from the primary battery preventing the drawing of current from the primary battery by devices connected to the secondary battery. The user can easily run two batteries without worrying about a dead primary battery. The user can combine a lithium-ion battery with another battery of any type.

Figure 2:
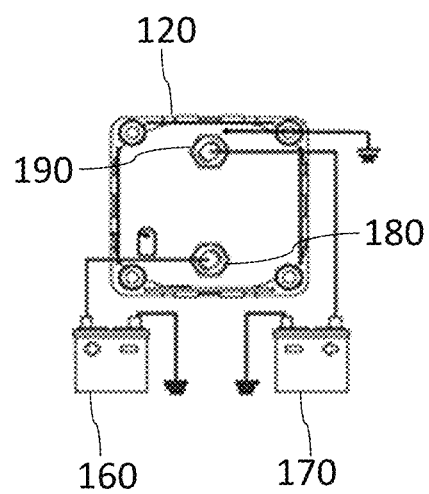
FIG. 2 is a schematic diagram showing the system connected with the primary battery and the secondary battery, according to an exemplary embodiment of the present invention.
Figure 3:
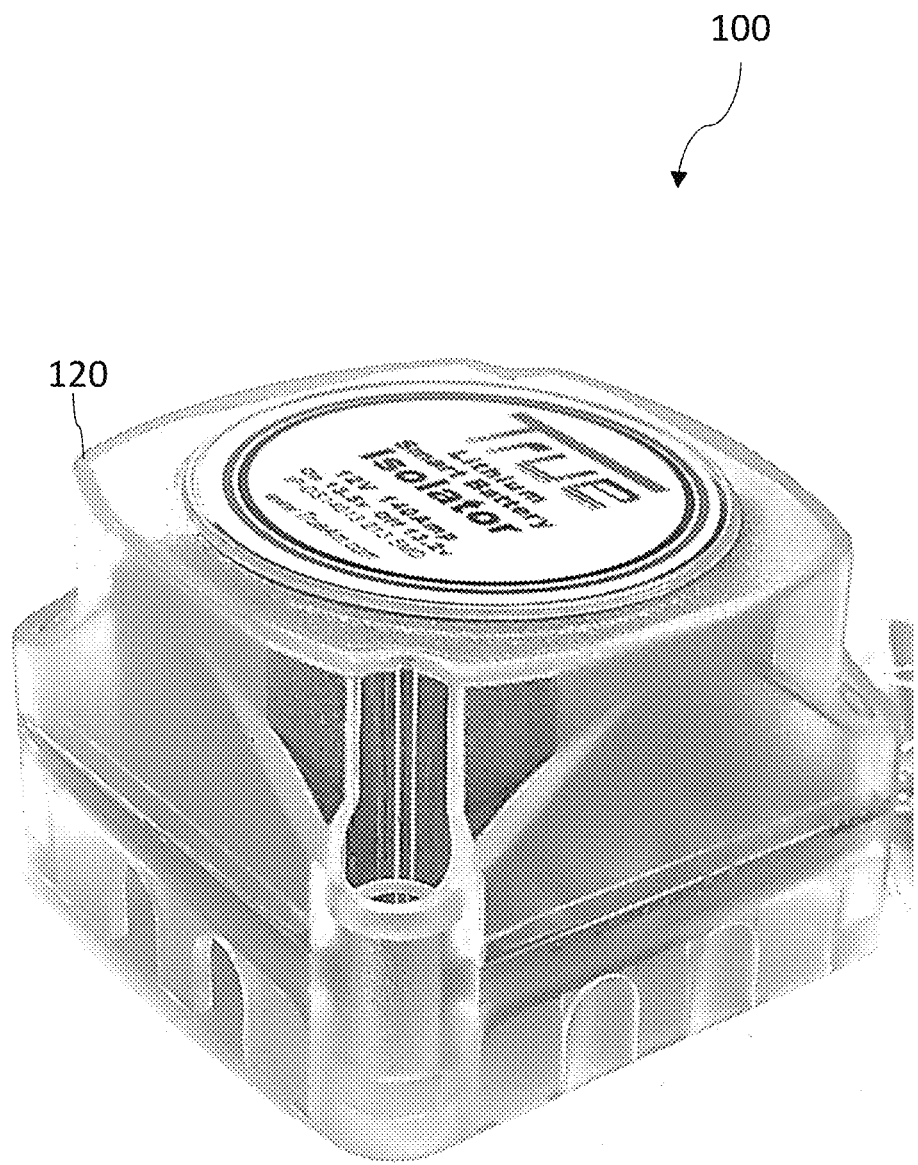
FIG. 3 is a perspective view of the system, according to an exemplary embodiment of the present invention.

Referring to FIG. 1 is a block diagram illustrating an environment of the disclosed system 100. The system 100 can be connected to a power supply 120 of the vehicle, such as an alternator of the vehicle. The disclosed system can draw current from the alternator for charging the batteries. The disclosed system can be connected to a primary battery 160 and an auxiliary battery 170. The auxiliary battery is also referred to herein as the secondary battery. FIG. 2 is another schematic diagram showing the system 100 connected to the two batteries. FIG. 3 shows a perspective view of the disclosed system 100 having a casing 120. As shown in FIG. 2, a port 180 protrudes from the casing and provides for connecting the primary battery. Another port 190 provides for connecting the auxiliary battery. The positive poles of the batteries can be connected to the disclosed system at ports 180 and 190, while the negative terminals can be connected to a common ground. The casing 120 can encase different components of the disclosed system 100. The casing can be made waterproof to prevent the ingress of dust and moisture that may otherwise harm the components of the disclosed system. The casing can also be made from a transparent or translucent material so that the inner components can be visible from the outside. Suitable indicators showing the status of the disclosed system, the charging of the primary battery, and the secondary battery may also be visible through the transparent casing. The casing can be compact in design so that it can be easily installed. Moreover, the transparent casing and compact design of the casing allows the indicators to be visible from different angles.

The system 100 includes a charging circuitry 130, a controller 140, and surge protection 150. The charging circuitry can provide for charging the batteries. The charging circuitry can detect the voltage and current output of the power supply 120. The charging circuitry can also incorporate dual sensing features that detect the charging status of the primary battery and the secondary battery, such as current voltage of the batteries. The controller can be configured with suitable algorithms that control the selective charging of the primary battery and the secondary battery. The controller can be operably coupled to the charging circuitry and can receive the detected voltage and current output of the power supply 120 and the charging status of the two batteries, or multiple auxiliary batteries as the case may be. The controller, based on the available power from the power supply, can decide if the secondary lithium ion battery has to be charged. The charging circuitry can also detect the voltage of the primary battery and the secondary battery and can determine their charge status. Based on the charge status of the two batteries and the amount of power available from the power supply, the controller can prioritize the charging of the primary battery and if additional power is available, the disclosed system can allow the secondary battery to be charged as well. However, if the power available is below the predetermined threshold i.e., if the available power is sufficient only for charging the primary battery, the secondary battery is cut off from charging. When additional power is available, the secondary battery can also be charged simultaneously. Moreover, the secondary battery is only charged when voltage available from the power source is good enough for charging lithium-ion battery to ensure safety and life of the battery. Also, when not charging, the secondary battery can be isolated from the primary battery by the disclosed system so that the device connected to the secondary battery may not draw power from the primary battery. The controller, by determining the available power supply and charge status of the two batteries, can efficiently distribute the power between the two batteries. A charging efficiency of more than 90 percent can be obtained by the disclosed system. Preferably, a charging efficiency of more than 95 percent can be obtained by the disclosed system. A surge controller 150 can also be provided for protecting the system from spikes.

In one implementation, the charging threshold can be about 13.2 Volts. When the engine is running and the charging source raises the voltage of the primary battery to 13.5 volts (cut in threshold), the controller engages a relay of the charging circuitry and connects the two batteries to charge simultaneously. This status can be shown by a blue LED that turns on upon charging the two batteries. However, when the voltage sources drop below 13.2 volts (cut out threshold) the disclosed system can disengage the relay, and the blue LED will go out. Herein only the primary battery may keep charging by the power source. When disengaged, the secondary battery is isolated from the primary battery, thereby preventing the power of the primary battery from being drained by the use of the accessories powered from the second battery. When the vehicle is restarted and the primary battery has recharged to 13.5 volts, the disclosed system reengages the relay, the second battery is connected to receive charging. It is to be noted that the controller can be programmed with a delay before engaging or disengaging, such as a delay of about 10 seconds. The surge controller can provide protection against ignition surge. The protection can be for both the batteries and the disclosed system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A system for managing the charging and discharging of dual batteries in a vehicle, the charging is from a power supply of the vehicle, the system comprises:
    a housing;
    a charging circuitry configured to charge a primary battery and a secondary battery, the secondary battery is a lithium-ion battery, wherein the charging circuitry is configured to determine a charging status of the primary battery and the secondary battery, wherein the charging circuitry is further configured to detect available voltage from the power supply; and
    a controller encased with the housing and operably coupled to the charging circuitry, wherein the controller is configured to:
        prioritize charging of the primary battery over the secondary battery,
        allow simultaneous charging of the primary battery and the secondary battery when the charging status of the primary battery is about 13.5 Volts,
        prevents charging of the secondary battery when the detected voltage of the power supply is below 13.2 Volts, and
        isolate the secondary battery to prevent the drawing of current from the primary battery by devices connected to the secondary battery.

2. The system according to claim 1, wherein the housing has a transparent cover.

3. The system according to claim 1, wherein the housing is made waterproof.

4. The system according to claim 2, wherein the system further comprises an LED indicator, the LED indicator turns on upon simultaneous charging of the primary battery and the secondary battery.

5. The system according to claim 4, wherein the LED indicator is encased within the transparent cover.

6. The system according to claim 1, wherein the primary battery is a lead acid battery.

7. A vehicle comprising:
    a system for managing the charging and discharging of dual batteries in the vehicle, the charging is from a power supply of the vehicle, the system comprises:
    a housing,
    a charging circuitry configured to charge a primary battery and a secondary battery, the secondary battery is a lithium-ion battery, wherein the charging circuitry is configured to determine a charging status of the primary battery and the secondary battery, wherein the charging circuitry is further configured to detect available voltage from the power supply, and
    a controller encased with the housing and operably coupled to the charging circuitry, wherein the controller is configured to:
        prioritize charging of the primary battery over the secondary battery, allowing simultaneous charging of the primary battery and the secondary battery when the charging status of the primary battery is about 13.5 Volts, prevents charging of the secondary battery when the detected voltage of the power supply is below 13.2 Volts, and isolate the secondary battery to prevent the drawing of current from the primary battery by devices connected to the secondary battery.

8. The vehicle according to claim 7, wherein the housing has a transparent cover, and the housing is waterproof.

9. The vehicle according to claim 7, wherein the primary battery is a lead acid battery.

10. The vehicle according to claim 8, wherein the system further comprises an LED indicator, the LED indicator turns on upon simultaneous charging of the primary battery and the secondary battery.

11. The vehicle according to claim 10, wherein the LED indicator is encased within the transparent cover.

12. A method for managing charging and discharging of dual batteries in a vehicle, the charging is from a power supply of the vehicle, the method comprising:

providing a system comprising:
a housing,
a charging circuitry configured to charge a primary battery and a secondary battery, the secondary battery is a lithium-ion batteries, wherein the charging circuitry is configured to determine a charging status of the primary battery and the secondary battery, wherein the charging circuitry is further configured to detect available voltage from the power supply, and a controller encased with the housing and operably coupled to the charging circuitry, wherein the controller is configured to:

prioritize charging of the primary battery over the secondary battery, allow simultaneous charging of the primary battery and the secondary battery when the charging status of the primary battery is about 13.5 Volts, prevents charging of the secondary battery when the detected voltage of the power supply is below 13.2 Volts, and isolate the secondary battery to prevent drawing of current from the primary battery by devices connected to the secondary battery.

13. The method according to claim 12, wherein the housing has a transparent cover.

14. The method according to claim 12, wherein the housing is made waterproof.

15. The method according to claim 13, wherein the system further comprises an LED indicator, the LED indicator turns on upon simultaneous charging of the primary battery and the secondary battery.

16. The method according to claim 15, wherein the LED indicator is encased within the transparent cover.

17. The method according to claim 12, wherein the primary battery is a lead acid battery.

\* \* \* \* \*